(12) United States Patent
Beck et al.

(10) Patent No.: US 6,615,570 B2
(45) Date of Patent: Sep. 9, 2003

(54) HEADER POSITION CONTROL WITH FORWARD CONTOUR PREDICTION

(75) Inventors: Folker Beck, Bettendorf, IA (US); Bruce Alan Coers, Hillsdale, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/894,040

(22) Filed: Jun. 28, 2001

(65) Prior Publication Data

US 2003/0000193 A1 Jan. 2, 2003

(51) Int. Cl.[7] .................... G06T 165/00; A01D 75/28
(52) U.S. Cl. ................ 56/10.2 E; 56/10.2 F; 701/50
(58) Field of Search .................. 56/10.2 R, 10.2 D, 56/10.2 E, 10.2 F, 208, DIG. 7, DIG. 10, DIG. 15; 172/2, 3, 4, 4.5, 5, 6, 7, 8, 9, 10; 701/50

(56) References Cited

U.S. PATENT DOCUMENTS

| 4,171,606 A | | 10/1979 | Ziegler et al. ................ 56/10.2 |
| 4,507,910 A | | 4/1985 | Thornley et al. ............ 56/10.2 |
| 4,776,153 A | | 10/1988 | DePauw et al. ............. 56/10.2 |
| 4,868,752 A | * | 9/1989 | Fujii et al. ................... 348/120 |
| 4,896,486 A | | 1/1990 | Lundahl et al. ............. 56/10.2 |
| 5,155,984 A | | 10/1992 | Sheehan ..................... 56/10.2 |
| 5,410,479 A | * | 4/1995 | Coker ......................... 180/168 |
| 5,442,552 A | * | 8/1995 | Slaughter et al. ............. 701/28 |
| 5,463,854 A | | 11/1995 | Chmielewski, Jr. et al. . 56/10.2 E |
| 5,704,200 A | | 1/1998 | Chmielewski, Jr. et al. . 56/10.2 E |
| 5,715,665 A | * | 2/1998 | Diekhans et al. ............. 172/4.5 |
| 5,715,666 A | * | 2/1998 | Huster et al. ............. 56/10.2 F |
| 5,794,421 A | * | 8/1998 | Maichle .................... 56/10.2 E |
| 5,911,669 A | * | 6/1999 | Stentz et al. ............... 56/10.2 F |
| 5,938,710 A | * | 8/1999 | Lanza et al. ................. 180/169 |
| 5,941,920 A | * | 8/1999 | Schubert ................... 180/89.13 |
| 5,951,613 A | * | 9/1999 | Sahm et al. .................... 37/348 |
| 6,068,060 A | * | 5/2000 | Ohtomo et al. ............... 172/4.5 |
| 6,073,070 A | * | 6/2000 | Diekhans ..................... 180/167 |
| 6,095,254 A | * | 8/2000 | Homburg ........................ 172/5 |
| 6,101,795 A | * | 8/2000 | Diekhans ..................... 180/401 |
| 6,173,614 B1 | | 1/2001 | Langkjaer et al. ............. 73/627 |
| 6,202,395 B1 | * | 3/2001 | Gramm ......................... 172/4 |
| 6,244,024 B1 | * | 6/2001 | Diekhans et al. ............. 172/4.5 |
| 6,389,785 B1 | * | 5/2002 | Diekhans et al. ............. 172/4.5 |

FOREIGN PATENT DOCUMENTS

| DE | 4220913 | * | 1/1994 |
| DE | 197 26 917 A1 | | 1/1999 |
| JP | 6-19546 | * | 1/1994 |

OTHER PUBLICATIONS

SICK AG, LMS200/LMS211/LMS220/LMS221/LMS291 Laser Measurement systems, 6 page of 40 pages, publication date—2000, published in Germany.

* cited by examiner

*Primary Examiner*—Thomas B. Will
*Assistant Examiner*—Nathan Mammen

(57) ABSTRACT

A system for harvester header height and tilt control includes a sensor, such as a crop edge detector, mounted on the harvester for predicting ground contour of an area a substantial distance in front of the header for generally the entire width of the header. An on-board processor calculates the desired header height and tilt for that area in advance of the harvester reaching the area. The early ground contour measurements enable faster and smoother header height adjustments requiring reduced hydraulic power. The predicted contour also facilitates early compensation for the effects of abrupt header attitude changes resulting from harvester ground wheels or tracks riding on that contour. The system can be used to maintain header height a preselected distance below the crop heads to reduce harvester throughput.

26 Claims, 7 Drawing Sheets

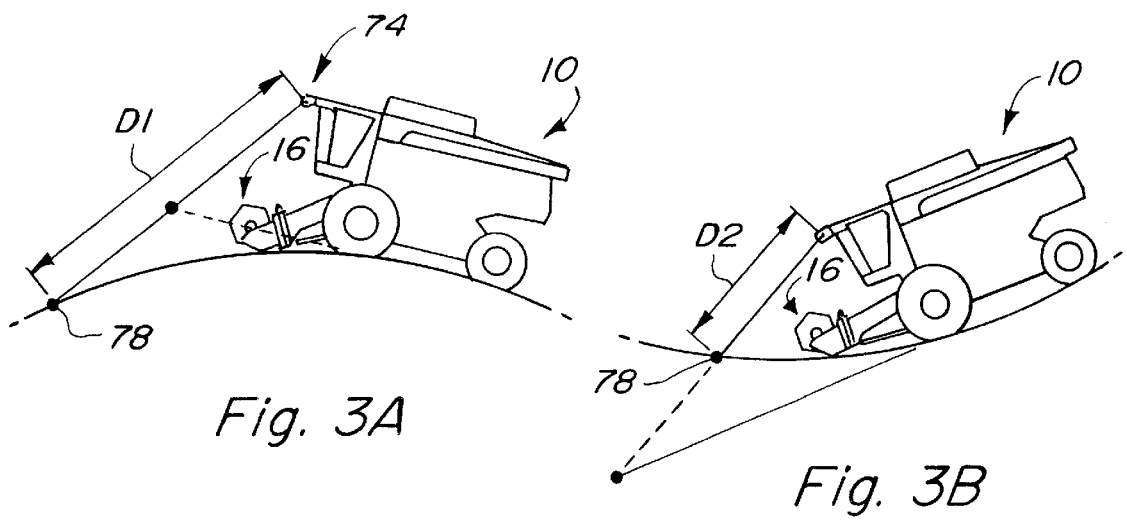
Fig. 3A
Fig. 3B
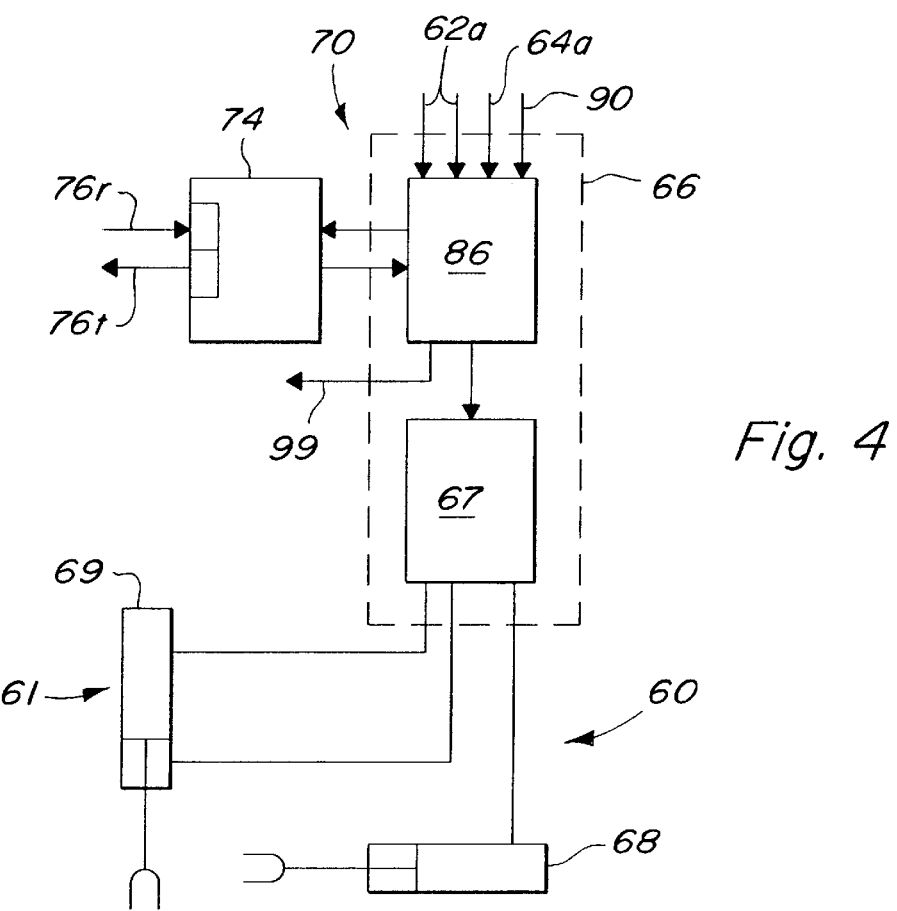
Fig. 4

HEADER POSITION CONTROL WITH FORWARD CONTOUR PREDICTION

BACKGROUND OF THE INVENTION

The present invention relates generally to agricultural harvesters and, more specifically, to header height control for such harvesters.

A self-propelled harvester such as a combine usually includes a header for engaging a number of transversely spaced rows or a substantial width of crop. To maintain the header at the desired level above the ground or below the crop heads for efficient harvesting and for header grounding avoidance, an automatic header height control system is provided which typically includes a mechanical feeler or an acoustic sensor or similar non-contact ground sensing device mounted on the header. Examples of previously available devices are shown in U.S. Pat. Nos. 6,173,614; 5,704,200; 5,463,854; 5,155,984 and 4,171,606. U.S. Pat. No. 4,776,153 shows a header height control system with a plurality of feelers and a tilt control.

Although available control systems generally provide good position control in most situations and relieve the operator of the tedious job of manually adjusting height or tilt with changing ground and crop conditions, several problems exist with the systems. Hydraulic power requirements and material stress levels often are high when the lift systems are providing a fast response. The systems often fail to respond in time to avoid inefficient crop pickup, excessive crop material intake, or grounding and damage of the header. System response time is a problem when the harvester is travelling at relatively high speeds, such as when operating in field conditions wherein crop yield is low, and when the harvester is operating in fields having substantial ground contour changes. Tilt response time at high speeds or in fields with very uneven surface contours is often too slow for headers having automatic tilting systems to maintain the header generally parallel to the ground such as shown in the aforementioned U.S. Pat. No. 4,776,153. Header grounding and damage, and improper header operating height, result in decreased productivity. When the harvester is crossing depressions such as valleys, gullies or swales, the header can be grounded and damaged before the lift system can respond to the sudden rise in the ground surface. Grounding is a particular problem when the front harvester wheels are in a depression and the header is adjacent a raised surface area. Near the apex of a hill or mounded area, the header is often too high and misses crop since the system cannot respond quickly to the abrupt change in ground surface.

BRIEF SUMMARY OF THE INVENTION

It is therefore an object of the present invention to provide an improved header position control system for a combine or other harvester. It is a further object to provide such a control system which overcomes most or all of the aforementioned problems.

It is another object of the invention to provide a header position control system having smoother response with reduced hydraulic power requirements and less material stress, particularly during high speed operations in fields with abruptly changing ground contours, than at least most previously available systems.

It is a further object to provide a header position control system for a harvester which reduces or eliminates the incidences of header over- or under-height when depressions or rises in the ground surface are encountered. It is still another object of the invention to provide a header position control system which predicts and compensates for the ground irregularities encountered by the ground wheel support structure and the header.

It is another object to provide an improved harvester height control system wherein desired header height and/or tilt position for a forward location is calculated in advance of the header and any ground sensing transducer on the header arriving at the location. It is still another object to provide such a system which is complementary to any conventional sensing transducer on the header and which can provide a predictive contour history over the entire width of the header.

It is yet a further object to provide an improved harvester position control system for maintaining cut height within a preselected range of the crop heads to reduce non-crop material throughput and increase productivity.

The system for improved header postition control includes a sensor, such as a crop edge detector, mounted on the harvester for measuring ground contour of an area a substantial distance in front of the header and providing a surface profile indication over the whole platform width. The sensor includes a transmitter mounted on the harvester for radiating a signal across an area approximately equal to the width of the path to be traversed by the header, and a receiver which receives reflected signals. Travel times of the signals from a radiated area in the path are utilized to estimate ground contour of that area. The ground contour can be estimated directly by scanning the area with a crop penetrating signal, such as a high frequency radar signal, and receiving reflections from the ground. By scanning with a laser device such as a rotatable crop edge sensor, signals are reflected from the crop and provide a crop contour signal. The crop contour signal can be used to maintain the header a preselected distance below the crop heads to reduce throughput and increase harvester productivity. The crop contour signal can also be used to estimate ground surface profile.

An on-board processor calculates the desired header height and/or tilt for an area in advance of the harvester reaching the area. The early ground contour/crop contour measurements enable the height control and tilt control, if the combine is so equipped, to begin to make corrections in advance of the header reaching the area for smoother adjustments with less stress on harvester components. Hydraulic power requirements and header reaction response time are reduced, features which are particularly important when the harvester is operated at relatively high speeds or in fields with abruptly changing ground surface contours. The contour prediction may also used to compensate for effects of header attitude changes resulting from harvester ground wheels or tracks riding on that contour.

These and other objects, features and advantages of the present invention will become apparent to one skilled in the art upon reading the following detailed description in view of the drawings.

BRIEF DESCRIPTION OF THE DRAWINGS

FIGS. 3A and 3B are schematic representations of the harvester showing the effects of ground contour on travel distance of a signal from the header position control system transceiver.

FIG. 4 is a schematic representation of a transceiver and control system utilized with the harvester of FIGS. 1–3.

DETAILED DESCRIPTION OF THE DRAWINGS

Figure 1:
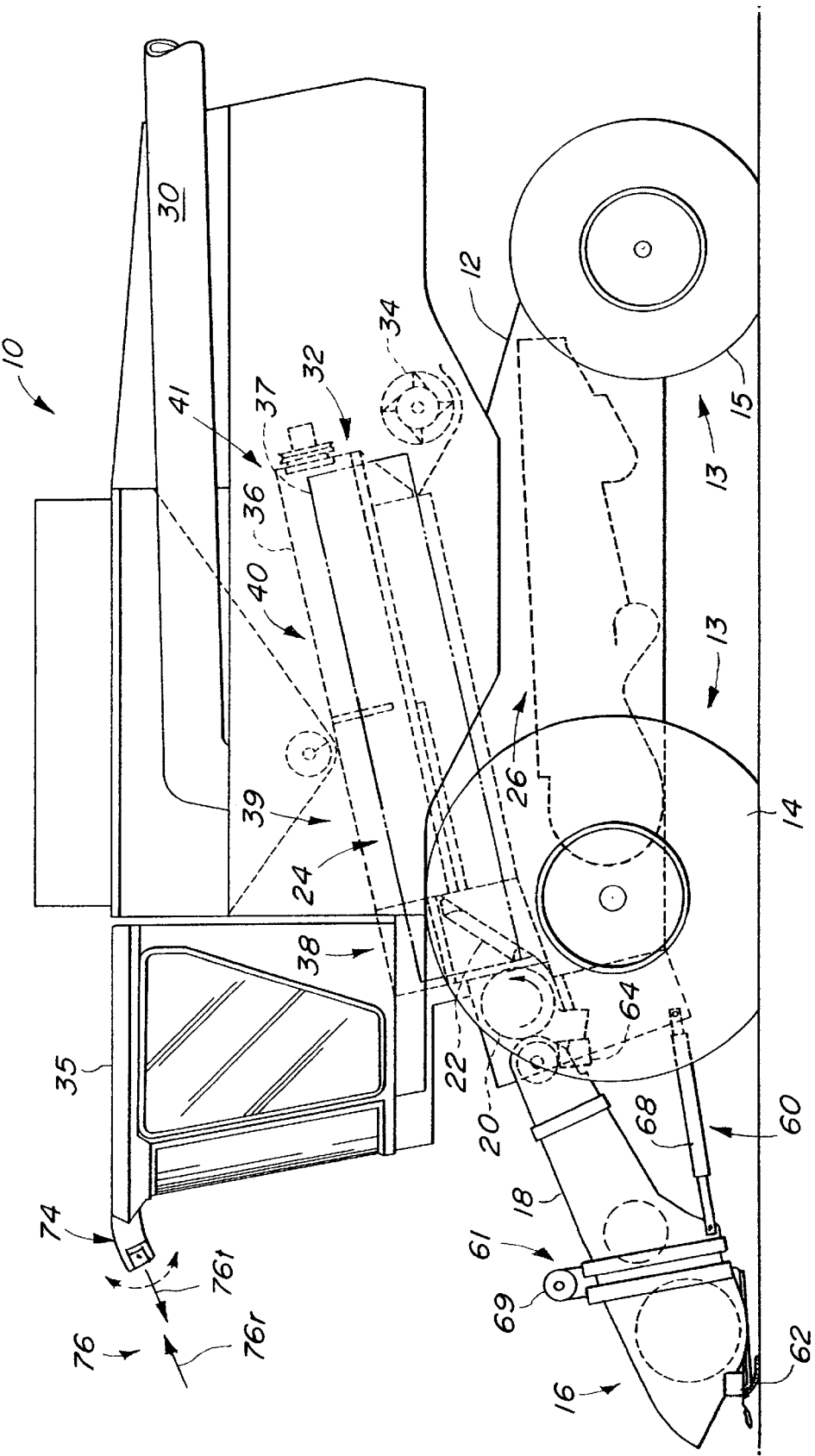
FIG. 1 is a side view of a harvester with a header position control system.

Referring now to FIG. 1, therein is shown an agricultural harvester or combine 10 comprising a main frame 12 having wheel structure 13 including front and rear ground engaging wheels 14 and 15 supporting the main frame for forward movement over a field of crop to be harvested. Although wheels 14 and 15 are shown, the wheel structure 13 could include or be composed of ground engaging tracks. Drive to the front wheels 14 is provided through a conventional hydrostatic transmission by an engine mounted on the frame 12.

A vertically adjustable header or harvesting platform 16 is used for harvesting a crop and directing it to a feederhouse 18. The feederhouse 18 is pivotally connected to the frame 12 and includes a conveyor for conveying the harvested crop to a beater 20. The beater 20 directs the crop upwardly through an inlet transition section 22 to a rotary threshing and separating assembly 24. Other orientations and types of threshing structures and other types of headers 16, such as transverse frame supporting individual row units, could also be utilized.

The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from an operator's cab 35.

The rotary threshing and separating assembly 24 comprises a cylindrical rotor housing 36 and a rotor 37 located inside the housing 36. The front part of the rotor and the rotor housing define the infeed section 38. Downstream from the infeed section 38 are the threshing section 39, the separating section 40 and the discharge section 41. The rotor 37 in the infeed section 38 is provided with a conical rotor drum having helical infeed elements for engaging harvested crop material received from the beater 20 and inlet transition section 22. Immediately downstream from the infeed section 38 is the threshing section 39. In the threshing section 39 the rotor 37 comprises a cylindrical rotor drum having a number of threshing elements for threshing the harvested crop material received from the infeed section 38.

Downstream from the threshing section 39 is the separating section 40 wherein the grain trapped in the threshed crop material is released and falls through a floor grate in the rotor housing 36 to the cleaning system 28. The separating section merges into a discharge section 41 where crop material other than grain is expelled from the rotary threshing and separating assembly 24. Although the harvester 10 is shown as a combine 10 for harvesting grain, it is to be understood that the present invention may also be utilized with other types of harvesters having vertically controlled headers.

The height of the header 16 is controlled by a hydraulic lift system indicated generally at 60, and a header tilt system indicated generally at 61 may also be provided to maintain the header generally parallel to the surface of the ground. Feelers 62 or other conventional height sensing devices such as acoustic sensors supported from transversely spaced locations on the header 16 provide an indication of header height. A feederhouse transducer 64 provides an indication of the angle of the feederhouse 18 relative to the frame 12. The signals from the devices 62 and 64 are connected via lines 62a and 64a (FIG. 4) to a controller 66 which includes electrohydraulic valve structure 67 to control hydraulic fluid flow to and from one or two lift cylinders 68 connected between the feederhouse 18 and the frame 12 to operate the lift system 60 to maintain the header within a desirable operating height range. The valve structure 67 also controls extension and retraction of a tilt cylinder 69 to rotate the header 16 about a fore-and-aft extending axis for operation parallel to the ground surface. When the signal from one or more sensors 62 on one side of the axis provides a raise indication while the signal from the opposite side provides a lower indication, the system will operate the cylinder 69 to tilt the header about the axis for the proper attitude correction. When sensors on both sides of the axis provide a raise or a lower indication, the cylinder 68 will be extended or retracted accordingly for the necessary height correction to maintain the header in a preselected range of operating heights. Such a height control system is shown and described in the aforementioned U.S. Pat. No. 4,776,153. The reaction times of the lift system 60 and the tilt system 61, however, are often too slow to compensate for abrupt changes in the ground surface contour, particularly when the harvester 10 is operating at relatively high speeds. The reaction time may also be too slow to compensate for sudden header position changes relative to the ground that result from one or more of the wheels 14 and 15 of the wheel structure 13 encountering a depression or raised area in the ground contour. The ability to cut a crop a preselected distance below the crop heads to limit throughput is also limited.

An improved header height control includes a ground or crop contour predictive system indicated generally at 70. The system 70 is mounted on the combine 10 to provide ground contour information generally over the entire width of the path P of the header 16. The system 70 includes a transceiver 74 located at a central location on the cab 35 for transmitting and receiving signals 76. The transceiver radiates signals 76t downwardly at an acute angle to the plane of the forward direction of the harvester 10 towards an area of ground 77 forwardly of the harvester 10. The signals 76t are preferably scanned or radiated across the entire width W of the path P of the header a distance on the order of 10 to 20 meters forwardly of the cab 35. Reflected signals 76r are received by the transceiver 74. The time interval between transmission of a signal 76t and the receipt of the signal 76r provides an indication of the distance between the transceiver 74 and the reflecting portion 78 of the ground surface or crop surface. In turn, the indication of distance provides ground contour information.

As best seen in FIGS. 3A and 3B, the distance D increases with a drop in the surface contour (D1 of FIG. 3a) and decreases with a rise in the contour (D2 of FIG. 3b). Therefore, if an increasing distance D is detected across an area 77, the controller 66 can initiate a lowering of the header 16 prior to the header and height sensing device 62 reaching the area. If the distance D decreases across the area, indicating a rise in the ground surface will soon be encountered by the header 16, the controller 66 can initiate header lifting. The system 70 is preferably utilized to complement the operation of the height sensing device 62 on the header 16 and initiate early reaction of the height control to rapidly changing ground contours for reduced reaction time and decreased lift power requirements. However, the system 70 can also be used for primary control of header height if desired. For example, when controlling header position so crop cutting is maintained within a preselected range of distances below the crop heads, grounding is not a problem and primary control is by the system 70.

The system 70 can also be utilized to complement the operation of the tilt system 61 to predict necessary header angle changes to avoid situations wherein the header is substantially offset from a parallel relationship with the ground. If the one side of the ground surface is rising relative to the opposite side for an area, advance information of the particular tilt necessary for that area can be provided for a timely tilt system response even at relatively high ground speeds.

The area scanned by the signals 76 includes areas 80 generally lying in the path of the harvester wheel structure 13 so that, if desired, the contour of the ground supporting the wheels 14 and 15 can be taken into consideration when the system is predicting the desired height control response for the area 77. The system 70 includes a processor 86 for calculating distances D based on signal travel time and converting the distances to ground contour information. The contour information for each area 77 is stored in memory to provide a ground contour history generally over a length of the path P extending from the present area 77 receiving impinging signals 76t rearwardly a distance at least equal to the distance between the header 16 and the rear wheels 15. Therefore, the effect on header position due to changing ground contour under the wheel support structure 13 can be factored into the desired height control response for any given area 77. The processor 86 can calculate the expected height response for a given area 77 on a time based history of the contour areas or on a distance based history. For a distance based history, harvester speed information is input to the processor via line 90.

In one embodiment, the transceiver 74 transmits a signal 76t that can penetrate standing crop to reach the ground, such as a high frequency radar beam. In another embodiment, a laser ranging device, such as a SICK model LMS 200 series laser measurement system, or a crop edge sensor (FIG. 5) mounted on a turntable 100, can be used for determining a crop surface contour which generally approximates the underlying ground surface contour. The crop edge sensor of FIG. 5 has a limited scan angle of approximately 15 degrees for determining crop edge and providing a guidance control signal on line 99. The turntable 100 rotates the sensor about an upright axis to permit a full platform width scan, which is on the order of 90 degrees, to be accomplished in several steps during time periods between guidance control signals. The frequency of the scans is preferably dependent on deviations of crop edge from a straight path with more scans being facilitated when the crop edge is straight and fewer guidance corrections are required.

Figure 5:
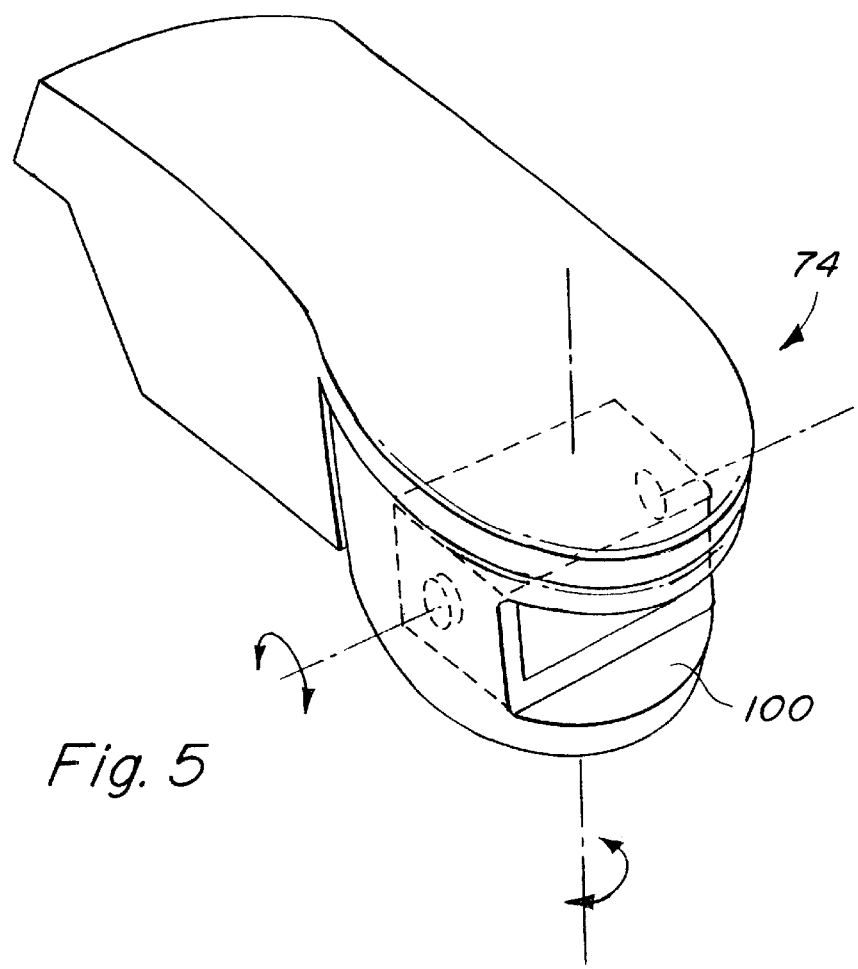
FIG. 5 is a perspective view of a transceiver utilized with the control system of FIG. 4.
Figure 6:
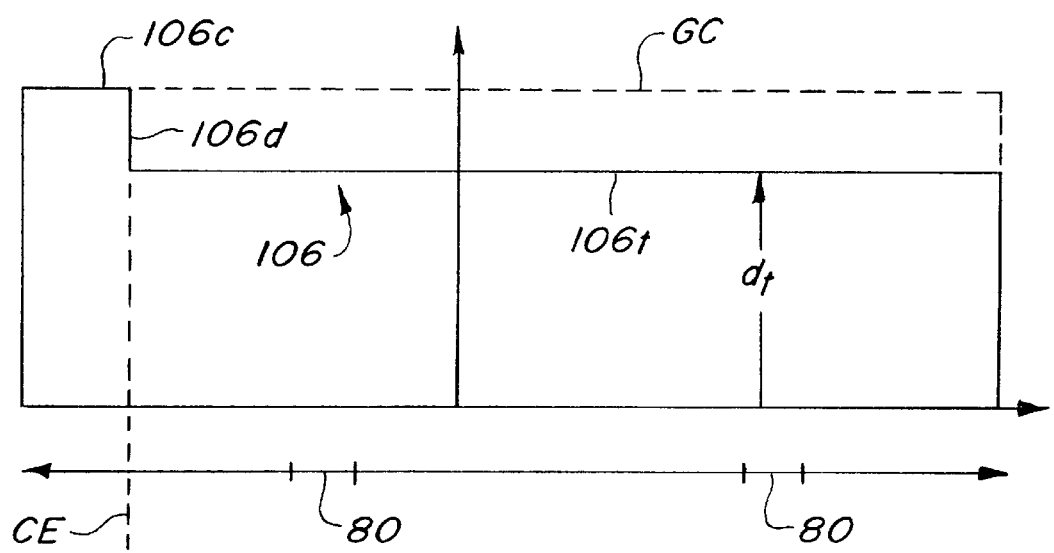
FIG. 6 is a typical distance signal for a full header width scan.

Referring to FIG. 6, a typical full platform width scan signal for the laser crop edge sensor 74 of FIG. 5 is represented by the solid line at 106. Distance, determined by the time for the signals 76t to travel to the area 77 and the corresponding reflected signals 77r to be received at the transceiver 74, is plotted against scan angle for a typical scan of approximately 90 degrees. The portion 106c represents the signals reflected from the ground in area 108 outside the crop edge (CE). At the crop edge CE there will be a sudden decease in the detected distance, represented by the segment 106d, as the signal 76t is reflected from the top of the crop at the crop edge rather than the ground. The distance $d_t$ to the top of the crop across the width of the path W is represented by the segment 106t. Theoretical ground contour (GC) therefore can be estimated by adding the distance change at the crop edge, represented by the length of the segment 106d, to each distance measurement on the segment 106. The theoretical ground contour GC is provided as an input to the height control system. If a transmitter with a crop-penetrating signal is utilized, the actual ground contour is detected and the distance $d_t$ will correspond to the line GC in FIG. 6. If the position of the header 16 is to be controlled to cut crop a preselected distance below crop heads, the crop surface contour prediction is used by the controller 66.

Figure 7:
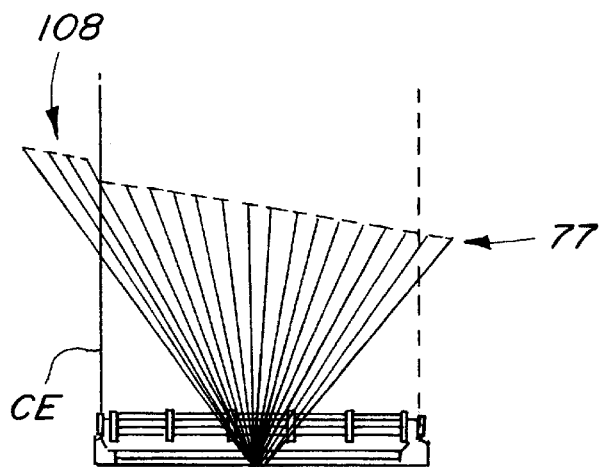
FIG. 7 is a top view of a harvester showing the effect of slope on a full header width scan.
Figure 8:
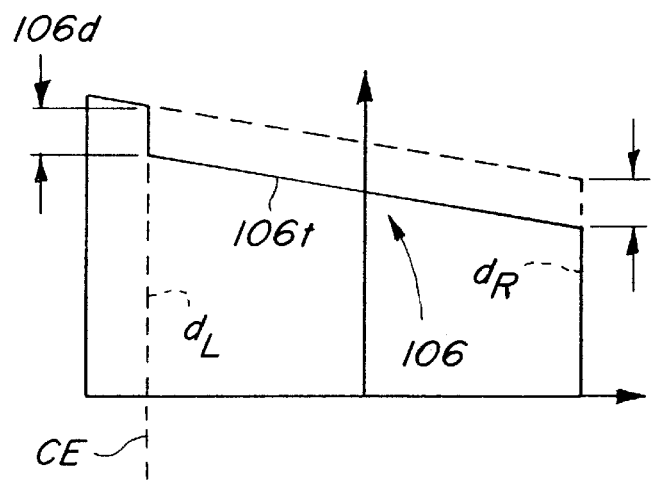
FIG. 8 is a typical distance signal for the harvester of FIG. 7.
Figure 9:
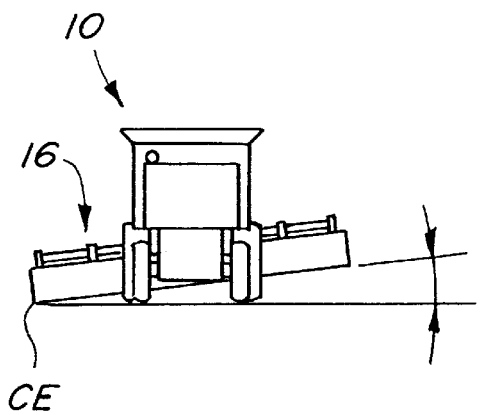
FIG. 9 is a rear view of the harvester of FIG. 7 showing the header tilted to accommodate the slope.

FIGS. 7, 8 and 9 illustrate ground contour prediction to initiate reaction of the tilt system 61 in a timely manner to maintain generally parallel relationship between the header and the surface of the ground. As seen in FIG. 8, the scan signal 106 shows a decreasing distance from the crop edge CE (the distance measured on the left side of the scan, $D_L$, is greater than the distance $D_R$ measured on the right side of the scan) to the opposite side of the header 16 which, in turn, indicates that the approaching area has a downward slope towards the crop edge CE (FIG. 8). The processor 86 (FIG. 4) calculates header tilt necessary for the radiated area and signals the electrohydraulic controller 67 to initiate actuation of the tilt cylinder 69 to assure the header will have the proper tilt angle by the time the header 16 reaches the area.

Figure 2:
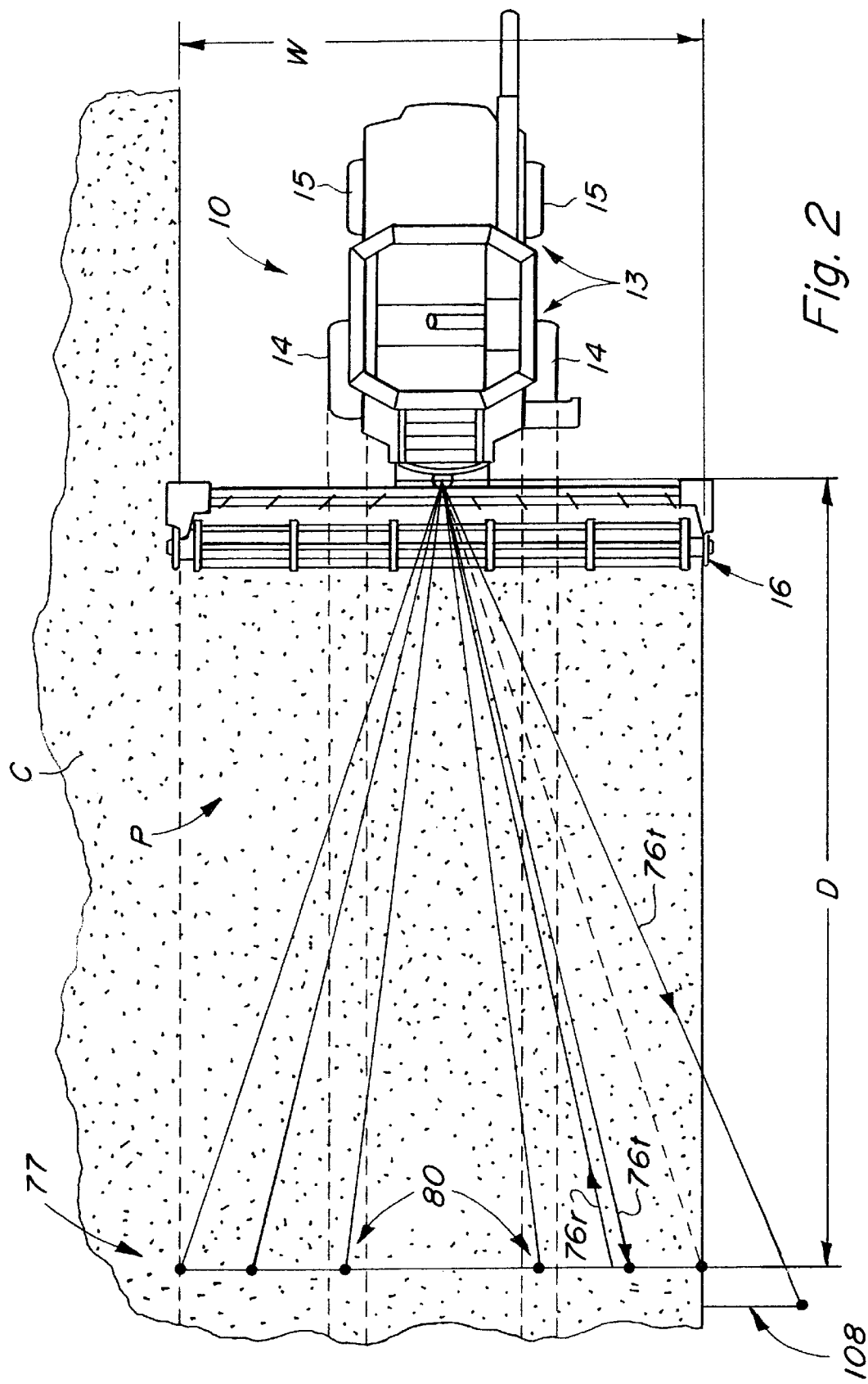
FIG. 2 is a schematic of a top view of the harvester of FIG. 1 operating in a field.

The angle of transmission of the signals 76t relative to the horizontal can be changed to increase or decrease the distance D (FIG. 2) between the header 16 and the ground area being radiated as the ground speed of the harvester 10 increases or decreases. The angle is selected to provide sufficient lead time for the lift and tilt control systems to react to rapidly changing surface contours.

Figure 10A:
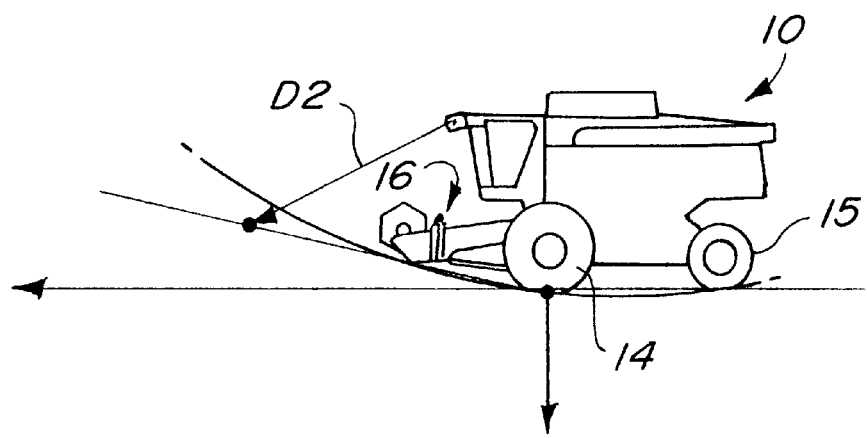
FIGS. 10A and 10B are schematic representations of the harvester showing one calculation method for determining the expected distance (D2) to a forward location.
Figure 10B:
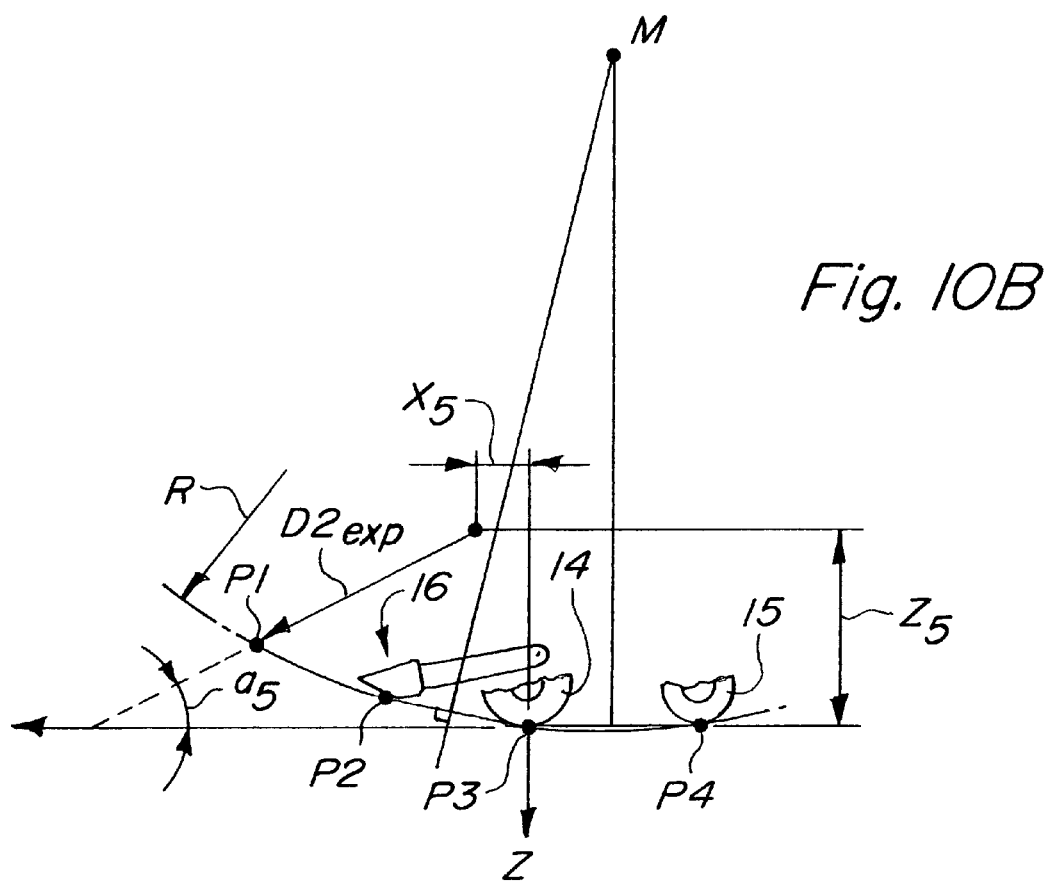

By way of example only, FIGS. 10A and 10B illustrate a calculation method model to estimate expected distance (D2) in an x-y coordinate system wherein four points P1-P4 are on a circle M of large radius R so that the calculation can be linearized. Sensor position is $(x_5, z_5)$, and $a_5$ is the inclination angle of the sensor. Feederhouse angle is zero when the header is on the ground. P1 is the point on the contour in the area being radiated. P2 is a point on the header, and P3 and P4 are wheel contact points. Other conventional calculation methods can be used for ground and crop contour predictions based on signal travel time.

Figure 11:
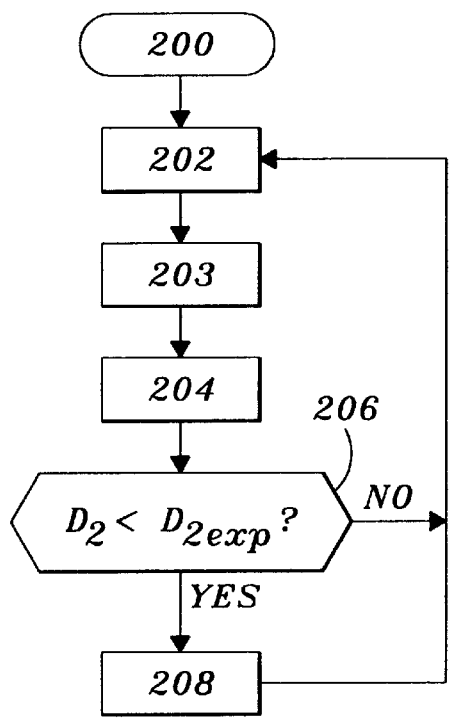
FIG. 11 is a flow chart illustrating an algorithm executed by the processor of FIG. 4 for controlling header height.

Referring to FIG. 11, after the predictive height control is initiated at 200, the processor 86 determines distance D2 based on signal travel time at 202. At 203, present feederhouse angle based on the signal from the feederhouse transducer 64 and present header height is determined from the feederhouse signal and from signals from the height sensing devices 62. The expected distance is calculated at 204 based on the feederhouse angle and header height at 203. The measured distance D2 (at 202) is compared with the expected distance (at 204), and if the measured distance D2 is smaller than the expected distance (206), indicating that the contour is rising, the processor 86 signals the controller to lift the header 16 (208) with a time or distance based delay, if necessary, to coordinate the positioning of the header for the particular area in the path with the arrival of the header at that area. If the header height is within the desired range of heights (206) or after the lift is initiated at 208, the cycle is begun again as the processor returns to the step 202.

Figure 12:
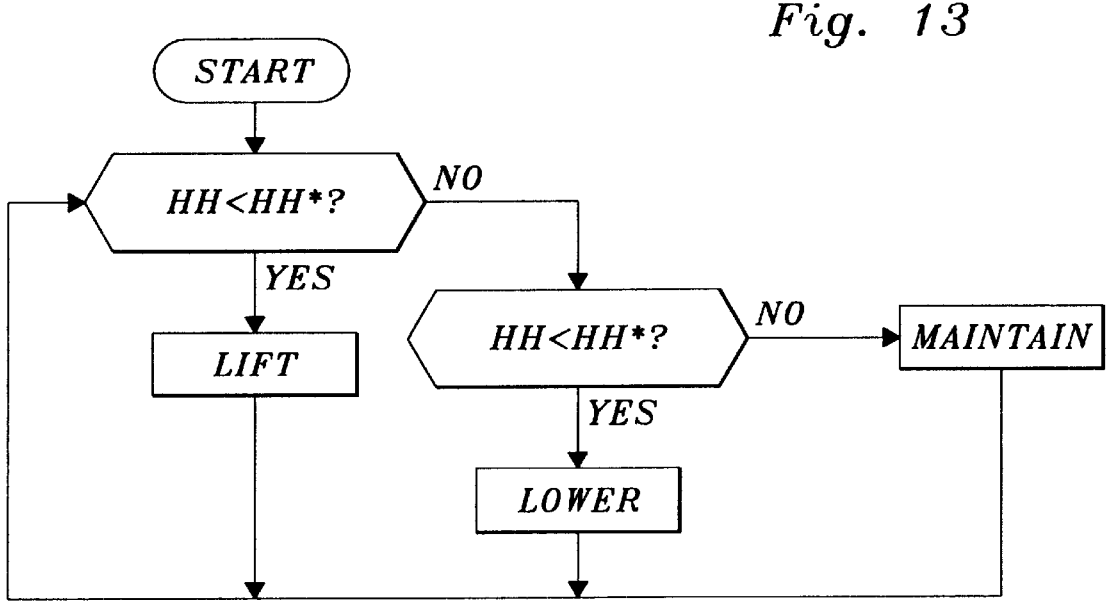
FIG. 12 is a flow chart for the header control loop for the processor in the control system of FIG. 4 for lowering the header or performing small header lifts when predictive height control is actively operating.

A control loop shown in FIG. 12 provides header lowering and small lifts of the header based on header height signals from the height sensing devices 62 on the header and on the feederhouse angle signal. Actual header height (HH) based on the signals from the devices 62 and the transducer 64 is compared at 210 with a desired header height range HH*. If the desired header height HH* is less than the measured HH, the processor 86 signals the valve structure 67 to extend the cylinders 68 and raise the header 16. If header height is below the desired range of heights at 212, the cylinders 68 are retracted to lower the header 16. Header height is maintained (214) when the header height is in the desired range. In the predictive control loop of FIG. 11, if the header 16 is being lifted at 208 because of a predicted contour change in an area, the processor ignores signals from the header sensors 62 to lower the header in order to avoid sudden reversals of the lift system and to assure adequate system response time to avoid problems such as grounding or cutting of the crop too far below the crop heads in the area.

Predictive header lowering usually is not required for operations wherein header height is maintained within an operating range of heights relative to the ground surface because of the fast lowering rate caused by the weight of the header. However, when the harvester is operating in a cut-below-crop head mode, it is usually advantageous for the operation to be purely predictive. When operating in such a mode, the control loop of FIG. 11 is modified to include an additional decision block to provide a predictive lowering function at the "no" output branch of block 206. Before returning control to block 202, the distance D2 is checked to see if it is larger than the expected distance, indicating the crop contour is dropping and a header lowering will be required to maintain crop cutting in the desired range of distances below the crop head. The processor 86 signals the controller to lower the header 16 with a time delay to coordinate the header lowering with the arrival of the header at the measured area. Since header lowering is much faster than header raising, the time delay for initiating lowering is typically greater than the time delay for initiating raising. Control is then returned to 202.

Figure 13:
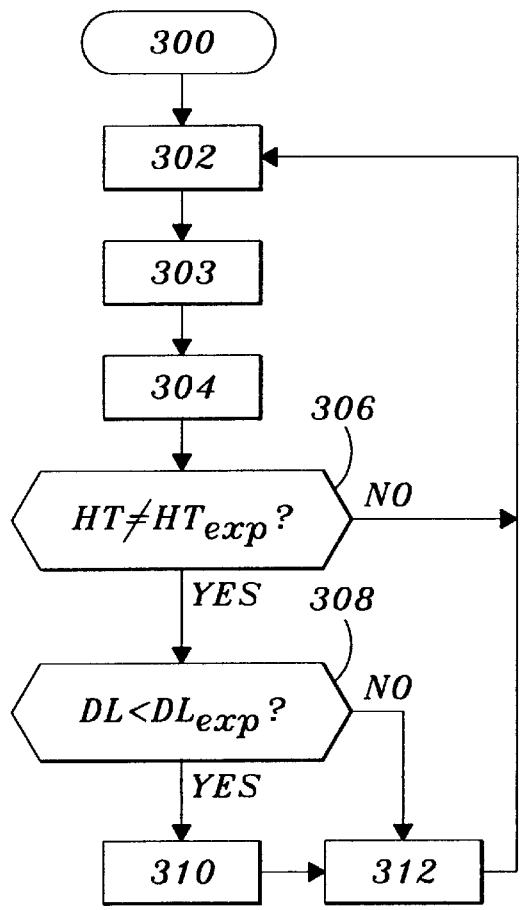
FIG. 13 is a flow chart illustrating an algorithm executed by the processor of FIG. 4 for controlling header tilt.

When the harvester 10 is equipped with a tilt system 61, control of the system is according to the flow chart shown in FIG. 13. Upon initiation of the predictive tilt control at 300, the distances $D_L$ and $D_R$ to the left and right, respectively, of the centerline of the combine are measured at 302. The header tilt angle HT is measured at 303 by a conventional transducer (not shown) mounted on the feederhouse 18 between the feederhouse frame and a front plate which mounts the header 16. After HT is measured, the processor 86 calculates the expected header tilt $HT_{exp}$ at 304 based on the value of HT found at 303 and calculates the expected distances $DL_{exp}$ and $DR_{exp}$. If the measured tilt HT is not within a preselected range of angles relative to the expected tilt $HT_{exp}$ (306), the distance $D_L$ is compared with the distance $DL_{exp}$ at 308. If the distance $D_L$ is less than $DL_{exp}$, which indicates the left side of the header 16 will need to be raised for the approaching area, the processor 86 signals the electrohydraulic controller 67 to initiate actuation of the tilt cylinder 69 to lift the left side of the header (310). If the distance $D_L$ is greater than $DL_{exp}$, which indicates the left side of the header 16 is too high, the processor 86 signals the controller 67 to initiate tilt cylinder operation to lower the left side of the header (312). If the measured HT is in the desired range (306) or after the necessary tilt correction has been initiated (310 or 312), the processor returns to the step 302. Preferably, the conventional tilt control using the transversely spaced header-mounted sensors 62 remains operational and is responsible for minor corrections to header tilt angle.

When the harvester 10 is operating in standing crops and the system is set to cut crop a preselected range of distances below the crop heads, the system is preferably operated in the predictive mode without need for the conventional header-mounted sensors, and predictive header lowering is enabled in the control loop of FIG. 11 as described above. Also, the delay between the contour prediction and the operation of the lift and tilt cylinders preferably is speed dependent (location based) for accuracy rather than dependant on time only.

Having described the preferred embodiment, it will become apparent that various modifications can be made without departing from the scope of the invention as defined in the accompanying claims.

We claim:

1. A method of controlling position of a harvester header to maintain the header within a preselected operating height range, the header having a preselected width and adjustably supported on a frame of a harvester for positioning by hydraulic motor structure, the frame supported by ground wheel structure for traversing a field having a ground surface contour, the method comprising:

detecting contour of a crop area at a location offset forwardly of the header; and utilizing the detected contour to automatically control the hydraulic motor structure to initiate a header movement, prior to the header reaching the crop area, to facilitate positioning of the header for operating within a range of positions in the crop area, thereby improving response of the header and reducing incidences of improper header position resulting from rapidly changing contours.

2. The method as set forth in claim 1 wherein the step of detecting includes supporting a transmitter at a transmitter location offset from the header and independent of header positioning changes.

3. The method as set forth in claim 2 including the step of detecting a change of distance from the transmitter location to the area, wherein the step of utilizing the detected contour includes initiating a lowering of the header when the detected change of distance indicates an increasing distance and initiating a raising of the header when the detected change of distance indicates a decreasing distance.

4. The method as set forth in claim 1 wherein the step of utilizing the detected contour includes determining ground contour on which the ground wheel structure will be supported when the header is operating in the area.

5. The method as set forth in claim 1 wherein the step of detecting contour of a crop area includes determining crop top locations, and further including the step of positioning the header for operating at a height within a preselected range of distances below the crop top locations to thereby control harvester throughput.

6. The method as set forth in claim 1 wherein the step of detecting contour includes radiating signals towards an area of ground having a width generally corresponding to the preselected width and receiving reflected signals from the area to provide an indication of ground surface contour over substantially the entire width of the header.

7. A method of controlling position of a harvester header to maintain the header within a preselected operating height range, the header adjustably supported on a frame of a harvester for positioning by motor structure, the frame supported by ground wheel structure for traversing a field having a ground surface contour, the method comprising:

detecting contour of a crop area at a location offset forwardly of the header;

utilizing the detected contour for controlling the motor structure to initiate header movement prior to the header reaching the crop area and facilitate positioning of the header for operating within a range of positions in the crop area, wherein the step of utilizing the detected contour improves response of the header and reduces incidences of improper header position resulting from rapidly changing contours; and wherein the step of utilizing the detected contour includes initiating a header tilt movement to facilitate movement of the header to a position generally parallel to the ground in the area prior to the header reaching the area.

8. A harvester having a frame supported on the surface of the ground by wheel structure for forward movement through a field of crop with changing ground contour, a header of preselected width supported for movement relative to the frame to maintain a generally constant position of the header relative to the ground, a header control system for automatically moving the header as the ground contour changes, and a ground contour detection system connected to the header control system, the ground contour detection system including:

a transmitter radiating a signal towards an area forwardly of the header;

a detector receiving reflected signals from the area and providing an indication of the ground contour in the area prior to the header reaching the area; and wherein the header control system is responsive to the indication of ground contour to facilitate automatic movement of the header towards a preselected position for the area prior to the header reaching the area so that a predictive and power-reducing response of the lift system to rapid changes in ground contour is facilitated.

9. The harvester as set forth in claim 8 wherein the signal is radiated over a width corresponding generally to the width of the crop being harvested so that the indication of ground contour corresponds to at least approximately the harvesting width.

10. The harvester as set forth in claim 9 wherein the transmitter comprises a crop edge detection transmitter.

11. The harvester as set forth in claim 8 wherein the ground contour detection system includes a processor providing a surface contour history of ground surface forwardly of the header and compensating for time delay between the ground contour indication and arrival of the header at the area.

12. The harvester as set forth in claim 8 including a position transducer connected to the header and providing a header height signal, and wherein the header control system is also responsive to the header height signal.

13. The harvester as set forth in claim 8 wherein the transmitter is supported from the frame above the header at a location independent of the vertical movement of the header.

14. The harvester as set forth in claim 13 wherein the indication of ground contour is a function of the distance the reflected signals travel, and wherein the lift system is responsive to an increasing distance of travel of the reflected signals to facilitate lowering of at least a portion of the header that will traverse an area from which the signals of increasing travel distance are reflected, the lift system responsive to a decreasing distance of travel of the reflected signals to facilitate raising of at least a portion of the header that will traverse an area from which the signals of increasing travel distance are reflected.

15. A harvester having a frame supported on the surface of the ground by wheel structure for forward movement through a field of crop with changing ground contour, a header of preselected width supported for vertical movement relative to the frame for harvesting the crop generally across the width of the header, the crop to be harvested lying in a path to be traversed by the header, and a header control system for automatically adjusting the header vertically as the ground contour changes to maintain the header within a range of heights for efficient harvesting and prevention of grounding of the header, the header control system including:

a transmitter radiating signals towards an area on the path forwardly of the header over a width generally corresponding to the preselected width;

a detector receiving reflected signals from the path and providing an indication of the ground contour over a substantial portion of the width of the path; and a header lift system connected to the header and responsive to the indication of ground contour to automatically initiate movement of the header towards a position within a desired range of heights for the location on the path before the header reaches the location.

16. The harvester as set forth in claim 15 including a height sensor connected to the header and to the lift system, the height sensor providing a header height indication, and wherein the lift system is also responsive to the header height indication.

17. The harvester as set forth in claim 15 wherein the substantial portion of the width includes an area of ground in a path engaged by the wheel structure as the harvester moves forwardly, and wherein the header lift system movement is dependent on the ground contour in the path to compensate for anticipated changes in position of the frame resulting from movement of the wheel structure over the area of ground.

18. In a harvester having a frame supported on the surface of the ground by wheel structure for forward movement through a field of crop with changing ground contour and crop height contour, a header supported for vertical movement relative to the frame for harvesting the crop generally across a preselected operating width, and a header control system for automatically adjusting the header vertically as the contours change to thereby maintain the header within a range of positions for efficient harvesting and prevention of grounding of the header, the header control system including:
- a transmitter radiating signals towards a location on the path forwardly of the header over a width generally corresponding to the preselected width;
- a detector receiving reflected signals from the path and providing an indication of at least one of the contours over a substantial portion of the entire width of the path; and
- a header positioning system connected to the header and responsive to the indication to automatically initiate movement of the header towards a position within a desired range for the location on the path before the header reaches the location.

19. The harvester as set forth in claim 18 including a height sensor connected to the header and providing a header height indication, and wherein the lift system is also responsive to the header height indication.

20. The harvester as set forth in claim 18 wherein the transmitter radiates signals that penetrate the crop and are reflected from ground surface locations in the path.

21. The harvester as set forth in claim 18 wherein the transmitter radiates signals that are reflected from the tops of plants in the path and the indication ground surface contour is estimated from the signals that are reflected form the tops of the plants.

22. The harvester as set forth in claim 18 wherein the header positioning system includes a header tilt control, and wherein a tilt control signal is provided to the header positioning system prior to the header reaching the position to initiate a ground-following tilt movement of the header.

23. The harvester as set forth in claim 18 wherein the transmitter comprises a crop edge detection transmitter, and wherein the detector also provides a crop edge signal for harvester guidance control.

24. The harvester as set forth in claim 23 wherein the transmitter has scan angle substantially less than scan angle required to scan the signals over the preselected width, and further comprising rotating structure operable to rotate the crop edge detection transmitter to scan the signals over the preselected width.

25. The harvester as set forth in claim 24 wherein the rotating structure is operated during periods wherein crop edge signal is not provided for guidance control.

26. The harvester as set forth in claim 18 wherein crop height contour is detected and wherein the desired range is a range of distances from the crop heads.

* * * * *